United States Patent

[11] 3,554,082

| [72] | Inventor | Armand Faulcon |
| | | Lyon, France |
| [21] | Appl. No. | 730,064 |
| [22] | Filed | May 17, 1968 |
| [45] | Patented | Jan. 12, 1971 |
| [73] | Assignee | Meyrat & Luisoni |
| | | Moudon, Switzerland |
| | | a firm of Switzerland |
| [32] | Priority | May 18, 1967 |
| [33] | | France |
| [31] | | No. 48662 |

[54] APPARATUS FOR TRACING CURVILINEAR PATHS ON WORKPIECES
5 Claims, 5 Drawing Figs.

| [52] | U.S. Cl. | 90/15 |
| [51] | Int. Cl. | B23q 5/00 |
| [50] | Field of Search | 77/58.34; 90/11.1, 15, 15.2 |

[56] References Cited
UNITED STATES PATENTS

| 222,901 | 12/1879 | Heckendorn | 90/15 |
| 1,316,718 | 9/1919 | Hall | 90/15 |
| 1,996,842 | 4/1935 | Stevens | 77/58X |
| 2,289,111 | 7/1942 | Fett | 90/15 |
| FOREIGN PATENTS | | | |
| 775,715 | 5/1957 | Great Britain | 90/11 |

Primary Examiner—Gerald A. Dost
Attorney—Young & Thompson

ABSTRACT: Apparatus for cutting out or inscribing workpieces of noncircular curvilinear form comprises a spindle that rotates in an eccentric that in turn rotates in a fixed bearing. The workpiece is fixed to the spindle and the tool is externally mounted, or vice versa. Separate gears are provided fixed to the spindle and to the eccentric for separately independently rotating the spindle and eccentric relative to each other. The direction of rotation of one relative to the other may be reversed. Also, the spindle can be driven by a noncircular gear so as to have variable angular velocity if it is desired to inscribe the workpiece with divisions that lie on a noncircular path but which are spaced equal distances apart.

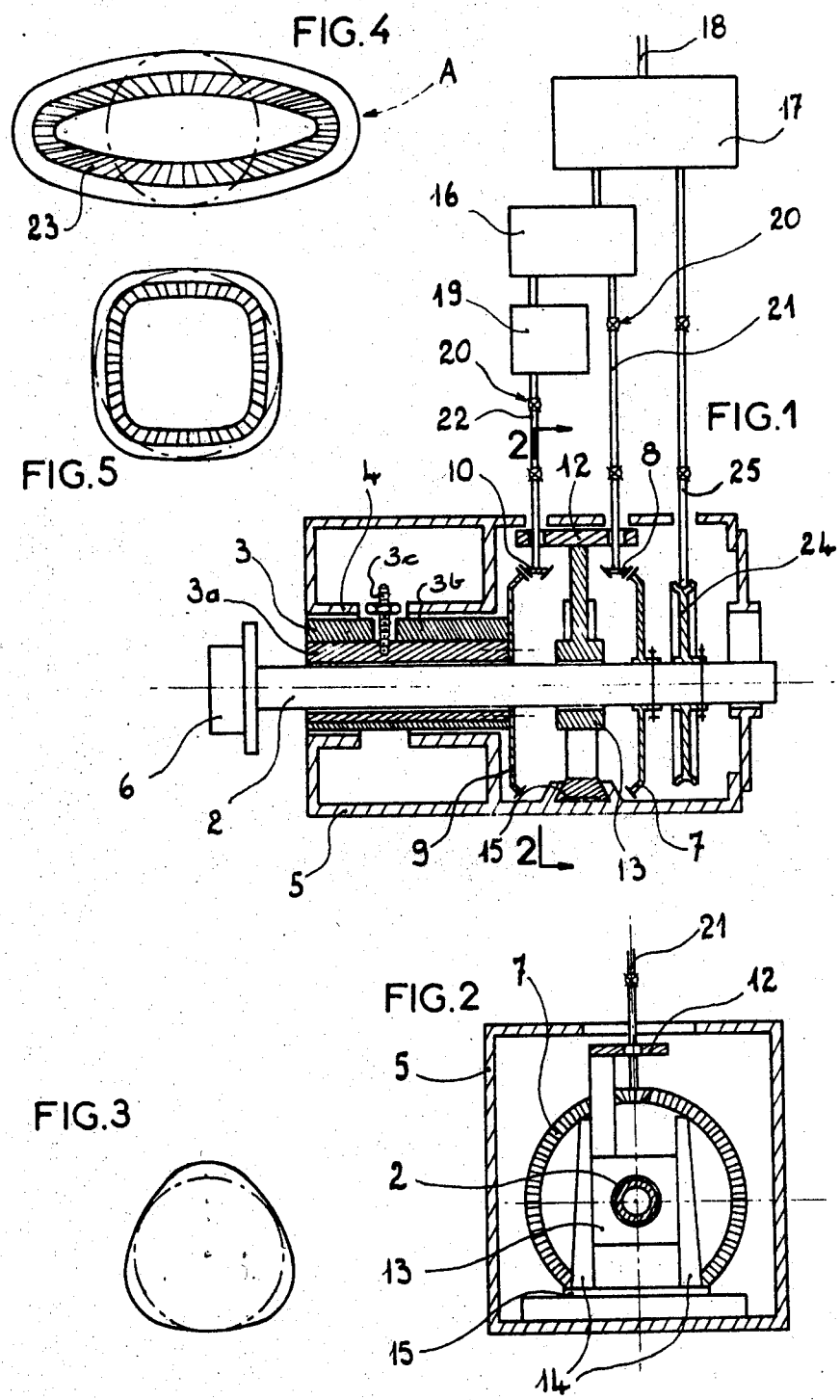

APPARATUS FOR TRACING CURVILINEAR PATHS ON WORKPIECES

In order to inscribe or cut out and perhaps also to mark divisions on articles whose form is elliptical or curvilinear and circumscribed about an imaginary circle, it is necessary to use an apparatus whose cost is quite high.

The present invention aims to overcome this disadvantage; and to this end, the invention provides apparatus which permits inscribing or cutting out and dividing elliptical shapes or all other curvilinear shapes circumscribed about a circle, so as to obtain either templets or forms, or decorative articles.

The apparatus of the present invention comprises a spindle which has means for securement to the workpiece or tool and which is moved by a selective drive means by which the spindle is moved and turned within the interior of an adjustable eccentric which itself turns in the interior of a bearing fixedly secured to the casing of the device so that the workpiece will be moved along a curvilinear path which is determined by the shape of the eccentric and by the speed and direction of rotation of the spindle and of the eccentric.

The accompanying schematic drawing shows by way of example one form of embodiment of this apparatus:

FIG. 1 is a side cross-sectional view of apparatus according to the invention;

FIG. 2 is a cross-sectional view on the line 2—2 of FIG. 1; and

FIGS. 3, 4 and 5 are front elevational views showing various shapes obtainable by the practice of the present invention.

The apparatus comprises a spindle 2 which rotates in an adjustable eccentric 3 which itself turns in a bearing 4 carried by the casing 5 of the apparatus.

Eccentric 3 comprises an inner sleeve 3a in which spindle 2 rotates and an outer sleeve 3b in which sleeve 3a rotates and that rotates in turn in bearing 4. Sleeves 3a and 3b are eccentric to each other, so that the throw of eccentric 3 may be adjusted by loosening locking member 3c, rotating sleeves 3a and 3b relative to each other, and again tightening member 3c.

The free end of the spindle 2 comprises a chuck 6 for mounting the workpiece or tool. The spindle 2 is also secured to a bevel gear 7 which engages with a small bevel pinion 8.

In the same fashion, the sleeve 3a of the eccentric 3 is secured to another bevel gear 9 which is concentric with the spindle 2 and which engages with a small bevel pinion 10.

The two small pinions 8 and 10 rotate freely in a support 12 fixed to a slide member 13 which severs as a bearing for the spindle 2 and which slides vertically within a fork 14 which is mounted upright on a dovetail support 15 which itself slides horizontally in a correspondingly profiled channel provided in the casing 5 of the apparatus.

In this way, it is possible to ensure the continuity of transmission between the pinions 8 and 10, on the one hand, and the bevel gears 7 and 9, respectively, on the other hand, despite eccentric movements of the spindle 2. The pinions 8 and 10 are driven in rotation by means of a gear change box 16 which in turn is driven by a selector 17 by a drive shaft 18 driven by a motor (not shown) which may for example by an electric motor. Preferably, between the gear change box 16 and the pinion 10 there is disposed a reversing mechanism 19 for reversing the direction of rotation.

Of course, to ensure correct transmission of movement between the gear change box and the reverser 19, on the one hand, which are fixed, and the pinions 8 and 10 which are subjected to vertical displacement in the casing 5, constant speed joints 20 of the cardan type are disposed on shafts 21 and 22 interconnecting these members.

Gear change box 16 drives reverser 19 and selectively drives or does not drive shaft 21. Also, box 16 drives shaft 22, and shafts 21 and 22, with any of a plurality of absolute relative angular speeds.

When the selector 17 is set to drive only the gear change box 16, then as soon as the motor shaft 18 is driven in rotation, the operation of the device will be as follows:

The two pinions 8 and 10 drive respectively the bevel gears 7 and 9 so that the spindle 2 rotates about its axis within the eccentric 3, which also turns within the bearing 4. As a result of the combination of these two movements, each point on the workpiece secured to the chuck 6 follows a curvilinear cyclic path of which the shape depends on the difference in the speeds between the two moving members, that is, on the speed reduction effected by the gear change box 16 and the eccentricity of eccentric 3 with respect to spindle 2.

This path is necessarily always concentric with an imaginary circle and touches that circle at at least two points, as shown by various line forms in FIGS. 3, 4 and 5.

By use of the reverser 19, that is, by reversing or not reversing the direction of rotation of the spindle 2 and the eccentric 3 relative to each other, it is also possible to modify the shape of the obtained paths of movement.

The present apparatus thus may be used with a fixed cutting tool to form pieces whose outer contour is curvilinear, as shown in FIGS. 3, 4 and 5; or a movable tool may be used to inscribe for example divisions 23 such as engine turning, as shown in FIG. 4.

In this latter case, the spindle 2 having a constant angular speed of rotation, it will be seen that the divisions thus provided are spaced irregularly and are substantially closer to each other in the regions where the angular velocity of the workpiece is less, as shown at A in FIG. 4. To correct this, according to a variant form of the invention, a wheel 24 is fixedly secured to spindle 2 and engages with an endless screw or worm which in turn is driven by a shaft 25 by means of selector 17 which drives gear change box 16 and selectively drives or does not drive shaft 25. The spindle 2 having the movement of eccentric 3 means of gear change box 16 is then subjected to the variable angular movement which depends on the form of the wheel 24 and is selected as a function of the path or arrangement of the divisions 23, so that the workpiece in effect has a constant angular velocity with respect to the apparatus that forms divisions 23, so that the divisions will be regularly spaced, as shown in FIG. 5. Of course shaft 21 and gear 7 are not driven at this time.

Selector 17 and gear change box 16 and reverser 19 are all conventional mechanisms that need not be further illustrated.

It should be noted that if the pinion 10 where disengaged from the gear 9, the apparatus would have the form of a simple divider. But in view of the differences of operation, the present apparatus permits obtaining an infinite number of curves of different shape.

Of course, the conical pinions can be replaced by other gearing such as worm pinions.

I claim:

1. Apparatus for causing a tool and a workpiece to move relative to each other such that the locus of the tool on the workpiece has a closed curvilinear form, comprising a spindle, an eccentric within which said spindle rotates, bearing means within which said eccentric rotates, means for separately independently rotating said spindle and eccentric, means for mounting one of said tool and workpiece on said spindle, and a gear change box for driving both of said spindle and eccentric.

2. Apparatus for causing a tool and a workpiece to move relative to each other such that the locus of the tool on the workpiece has a closed curvilinear form, comprising a spindle, an eccentric within which said spindle rotates, bearing means within which said eccentric rotates, means for separately independently rotating said spindle and eccentric, means for mounting one of said tool and workpiece on said spindle, said means for rotating said spindle and eccentric comprising gears fixed to each of said spindle and eccentric, and constant velocity couplings between said gears and said rotating means for rotating said gears at constant velocity and for accommodating relative movement between said rotating means and said gears.

3. Apparatus for causing a tool and a workpiece to move relative to each other such that the locus of the tool on the workpiece has closed curvilinear form, comprising a spindle, an eccentric within which said spindle rotates, bearing means within which said eccentric rotates, means for separately independently rotating said spindle and eccentric, and means for mounting one of said tool and workpiece on said spindle, said means for rotating said spindle in said eccentric comprising a gear fixed to and concentric with said spindle and whose teeth lie on a circle.

4. Apparatus for causing a tool and a workpiece to move relative to each other such that the locus of the tool on the workpiece has a closed curvilinear form, comprising a spindle, an eccentric within which said spindle rotates, bearing means within which said eccentric rotates, means for separately independently rotating said spindle and eccentric, and means for mounting one of said tool and workpiece on said spindle, said means for rotating said spindle in said eccentric comprising a gear fixed to and concentric with said spindle and whose teeth lie on a closed curve which departs substantially from a circle.

5. Apparatus for causing a tool and a workpiece to move relative to each other such that the locus of the tool on the workpiece has a closed curvilinear form, comprising a spindle, an eccentric within which said spindle rotates, bearing means within which said eccentric rotates, means for separately independently rotating said spindle and eccentric, means for mounting one of said tool and workpiece on said spindle, said means for rotating said spindle comprising two gears fixed to said spindle, the teeth of one of said gears lying on a circle, the teeth of the other of said gears lying on a closed curve that departs substantially from a circle, and means for selectively individually driving one of said gears to rotate said spindle within said eccentric selectively with constant angular velocity or with variable angular velocity.